(12) United States Patent
Chen et al.

(10) Patent No.: US 8,139,350 B2
(45) Date of Patent: Mar. 20, 2012

(54) NOTEBOOK COMPUTER

(75) Inventors: Yu-Lun Chen, Taipei (TW); Yu-Yuan Lin, Taipei (TW); Yung-Chih Kuo, Taipei (TW)

(73) Assignee: Compal Electronics, Inc., Taipei (TW)

( * ) Notice: Subject to any disclaimer, the term of this patent is extended or adjusted under 35 U.S.C. 154(b) by 145 days.

(21) Appl. No.: 12/765,864

(22) Filed: Apr. 23, 2010

(65) Prior Publication Data

US 2011/0182016 A1    Jul. 28, 2011

(30) Foreign Application Priority Data

Jan. 26, 2010    (TW) ................................ 99102098 A

(51) Int. Cl.
*G06F 1/16* (2006.01)
(52) U.S. Cl. ..................... 361/679.26; 345/169; 341/22; 200/521; 400/492
(58) Field of Classification Search .................. 400/492, 400/66, 489, 491, 472, 76, 485; 200/344, 200/5 A, 408, 293.1, 521, 516, 314, 310; 341/22, 34, 150, 27; 345/163, 156, 173, 345/211, 214, 161, 168, 169, 166; 361/679.09, 361/679.27, 679.55, 679.04, 679.26, 679.32, 361/679.08, 679.52, 679.41, 679.22, 679.06
See application file for complete search history.

(56) References Cited

U.S. PATENT DOCUMENTS

| 7,286,341 B1* | 10/2007 | Chang et al. ............. 361/679.09 |
| 2004/0075589 A1* | 4/2004 | Wang et al. ...................... 341/22 |
| 2007/0132733 A1* | 6/2007 | Ram ............................. 345/163 |

FOREIGN PATENT DOCUMENTS

| TW | M285741 | 1/2006 |
| TW | M305564 | 1/2007 |
| TW | M309157 | 4/2007 |

OTHER PUBLICATIONS

"Office Action of Taiwan Counterpart Application", issued on Dec. 14, 2011, p1-p4, in which the listed references were cited.

\* cited by examiner

*Primary Examiner* — Hung Duong
(74) *Attorney, Agent, or Firm* — Jianq Chyun IP Office

(57) ABSTRACT

A notebook computer including a host and a keyboard is provided. The host has an assembling region. The keyboard module disposed at the assembling region includes a keyboard and a keyboard frame. The keyboard has a substrate and multiple keys, wherein the keys are disposed on the substrate. The keyboard frame has a frame body and at least one spring arm disposed at a sidewall of the frame body. The frame body is disposed on the substrate and has multiple openings for exposing the keys. Two ends of the spring are connected to the sidewall. A gap is formed between a center portion of the spring arm and the sidewall of the frame body. Further, the center portion has a first position-limiting structure protruding out of the assembling region, and the first position-limiting structure is mutually interfered with the host.

5 Claims, 5 Drawing Sheets

NOTEBOOK COMPUTER

CROSS-REFERENCE TO RELATED APPLICATION

This application claims the priority benefit of Taiwan application serial no. 99102098, filed on Jan. 26, 2010. The entirety the above-mentioned patent application is hereby incorporated by reference herein and made a part of specification.

BACKGROUND OF THE INVENTION

1. Field of the Invention

The present invention relates to a notebook computer. More particularly, the present invention relates to a notebook computer having a keyboard module that is easy to be assembled/disassembled.

2. Description of Related Art

Development of notebook computers always has a trend of simple assembly. To meet consumer's demand of powerful functions of the notebook computer, a central processing unit (CPU) of the notebook computer is necessarily to be replaced for upgrading, and a plurality of peripheral devices in a host of the notebook computer are also required to be replaced. For example, the peripheral devices such as a mother board, a hard drive, interface cards, a cooling device or memories, etc. can all be selected for upgrading. However, a user usually does not know a manufacturer's original design type of a casing of the notebook computer, so that the user has to request a special dealer or the manufacture for a professional replacement.

Regarding a process of assembling a keyboard module to the host, the keyboard module is disposed above a circuit board, and is locked to the host of the notebook computer by screws. However, a conventional assembling process of the keyboard module is complicated, and a hand tool such as a screwdriver has to be used to assemble/disassemble the keyboard module, which is inconvenient to the user. Moreover, the keyboard module has to be removed first during disassembling or maintenance of a plurality of devices within the notebook computer such as the hard drive, the CPU or various interface cards. If the keyboard module is locked according to the conventional assembling method, it is inconvenient for maintenance, and is labour consuming and time consuming.

Moreover, limited by a fixing approach between the keyboard module and the host, the user is not easy to fulfil the replacement. Namely, the user has to disassemble the keyboard module, so as to replace important devices within the host, such as the hard drive or the CPU, etc.

SUMMARY OF THE INVENTION

The present invention is directed to a notebook computer, in which a keyboard module is easy to be assembled to or disassembled from a host.

The present invention provides a notebook computer including a host and a keyboard module. The host has an assembling region. The keyboard module is disposed at the assembling region of the host, and includes a keyboard and a keyboard frame. The keyboard has a substrate and a plurality of keys disposed on the substrate. The keyboard frame includes a frame body and at least one spring arm disposed at a sidewall of the frame body. The frame body is disposed on the substrate and has a plurality of openings for exposing the keys. Two ends of the spring arm are connected to the sidewall of the frame body, and a gap is formed between a center portion of the spring arm and the sidewall of the frame body. Further, the center portion has a first position-limiting structure protruding out of the assembling region, and the first position-limiting structure is mutually interfered with the host.

In an embodiment of the present invention, the spring arm and the frame body are formed integrally.

In an embodiment of the present invention, the sidewall has a concave portion located corresponding to the center portion of the spring arm, and the gap is located between the center portion of the spring arm and the concave portion.

In an embodiment of the present invention, the host further has a second position-limiting structure mutually interfered with the first position-limiting structure, wherein the second position-limiting structure is disposed at a side of the assembling region corresponding to the first position-limiting structure, wherein the first position-limiting structure is a bump, and the second position-limiting structure is a convex rib.

According to the above descriptions, the keyboard module of the notebook computer of the present invention is easy to be assembled to the host or disassembled from the host, so that a maintenance convenience is improved.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
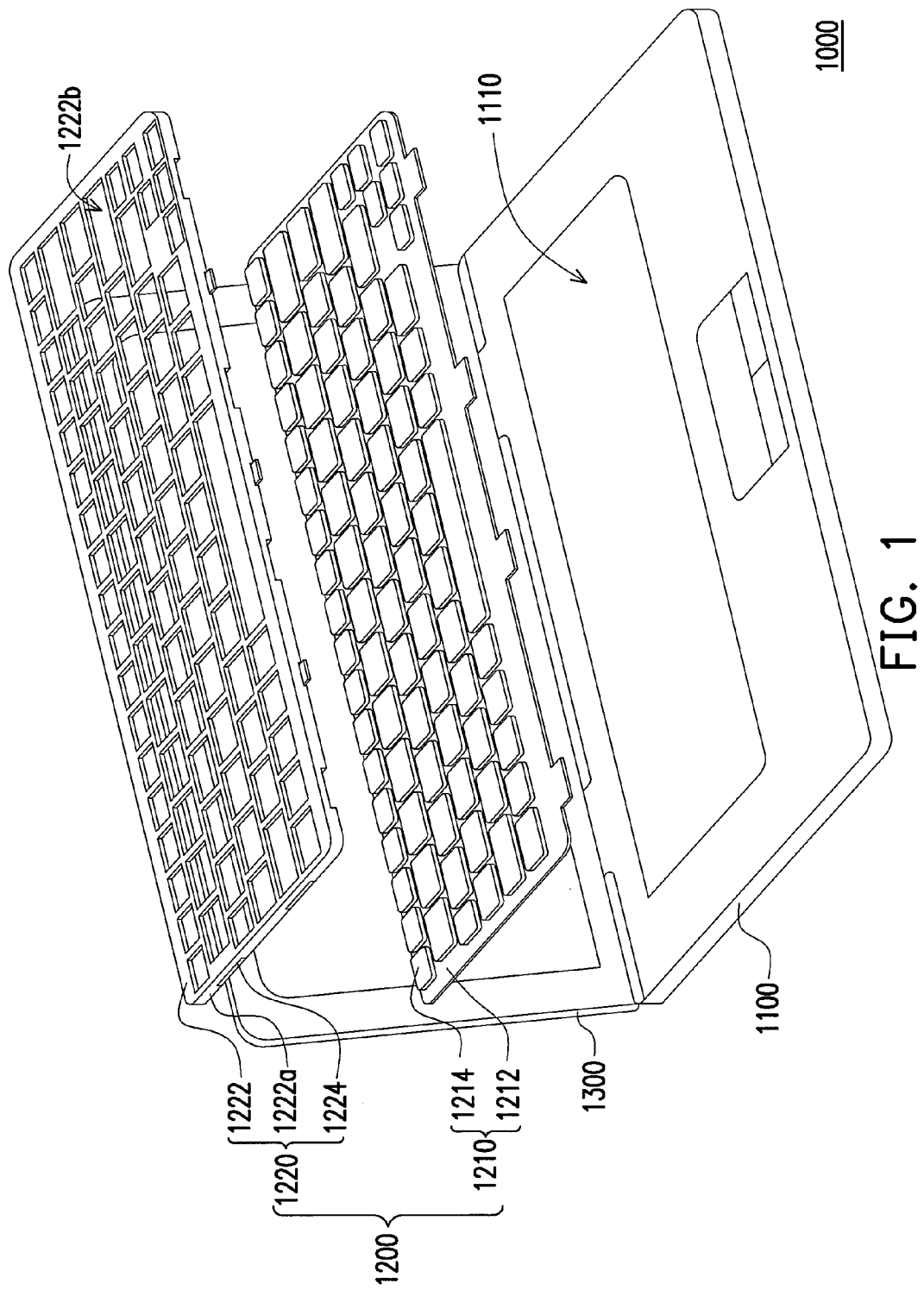
FIG. 1 is an exploded view of a notebook computer according to an embodiment of the present invention.
Figure 2:
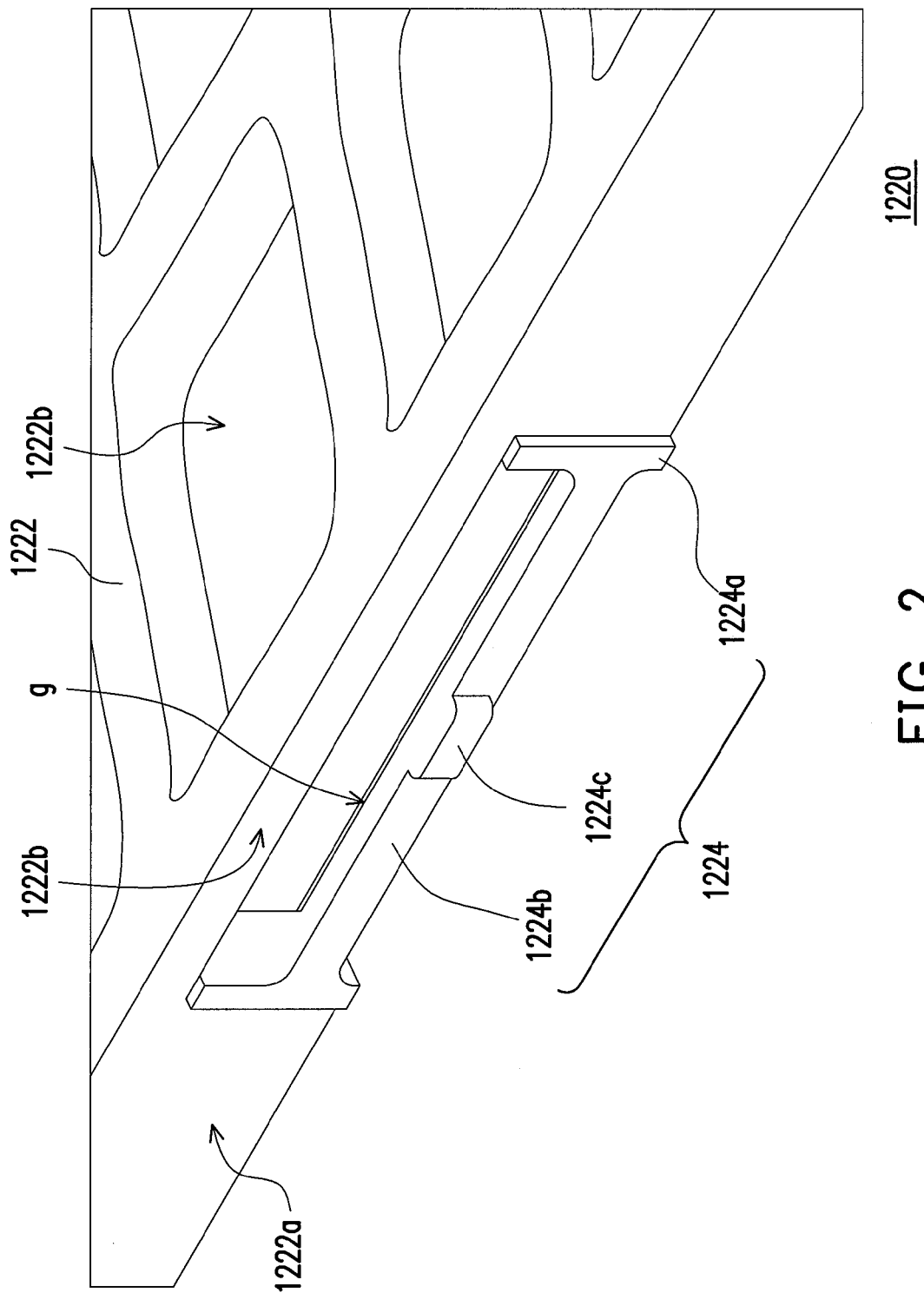
FIG. 2 is a partial enlarged view of a keyboard frame of FIG. 1.
Figure 3:
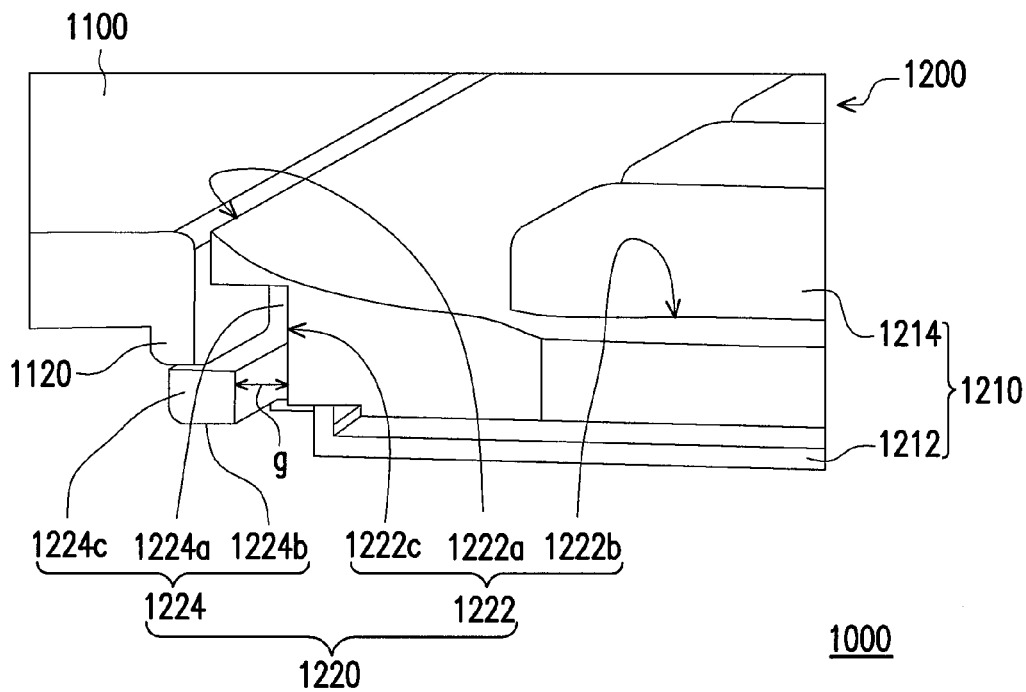
FIG. 3 is a partial cross-sectional view of a notebook computer of FIG. 1 when a host and a keyboard module thereof are assembled.

FIG. 1 is an exploded view of a notebook computer according to an embodiment of the present invention, FIG. 2 is a partial enlarged view of a keyboard frame of FIG. 1, and FIG. 3 is a partial cross-sectional view of the notebook computer of FIG. 1 when a host and a keyboard module are assembled. Referring to FIG. 1, FIG. 2 and FIG. 3, the notebook computer 1000 includes a host 1100 and a keyboard module 1200, wherein the host 1100 has an assembling region 1110, and the keyboard module 1200 is disposed at the assembling region 1110, and includes a keyboard 1210 and a keyboard frame 1220.

The keyboard 1210 has a substrate 1212 and a plurality of keys 1214. The keyboard frame 1220 includes a frame body 1222 and at least one spring arm 1224 disposed at a sidewall 1222a of the frame body 1222. The frame body 1222 is disposed on the substrate 1212 of the keyboard 1210, and has a plurality of openings 1222b for exposing the keys 1214.

Two ends 1224a of the spring arm 1224 are connected to the sidewall 1222a, and a gap g is formed between a center portion 1224b of the spring arm 1224 and the sidewall 1222a. The center portion 1224b has a first position-limiting structure 1224c, the first position-limiting structure 1224c protrudes out of the assembling region 1110, and is mutually interfered with the host 1110, so as to fix the keyboard module 1200 to the host 1100. When the keyboard module 1200 of the notebook computer 1000 is assembled to the host 1100, the assembling is implemented through deformation of the spring arm 1224 and mutual interference between the first position-limiting structure 1224c and the host 1100. In other words, the keyboard module 1200 of the notebook computer 1000 can be assembled to the host 1100 according to a non-screw (screwless) locking method, so that the keyboard module 1200 can be easily assembled to the host 1100 or dissembled from the host 110 without using a hand tool such as a screwdriver, so as to facilitate replacing important devices such as a hard drive or a central processing unit (CPU), etc. in the host 1100.

As shown in FIG. 1, the spring arms 1224 of the present embodiment are disposed on two opposite sidewalls 1222a of the frame body 1222, and two spring arms 1224 are disposed at each sidewall 1222a. In the present embodiment, a material of the keyboard frame 1220 can be plastic, and the keyboard frame 1220 can be formed by injection molding, and the spring arms 1224 and the frame body 1222 are formed integrally. In another embodiment, the spring arms 1224 and the frame body 1222 can also be independently formed, and two ends 1224a of the spring arm 1224 can be connected to the sidewall 1222a of the frame body 1222 through inlay, welding and adhesion, etc. A connection method of the spring arm 1224 and the sidewall 1222a can be changed according to an actual design requirement. Certainly, disposing positions and a number of the spring arms 1224 can also be changed according to the actual design requirement.

The sidewall 1222a has a concave portion 1222c (shown in FIG. 3) located corresponding to the center portion 1224b of the spring arm 1224, and the gap g is located between the center portion 1224b of the spring arm 1224 and the concave portion 1222c. In another embodiment, the sidewall 1222a does not have the concave portion 1222c, but a bended spring arm 1224 is used, and the bended spring arm 1224 has an arc shape when it is not deformed by force, and there is also the gap g between the sidewall 1222a and the center portion 1224b of the spring arm 1224.

Moreover, the host 1100 further has a second position-limiting structure 1120 mutually interfered with the first position-limiting structure 1224c, and the second position-limiting structure 1120 is disposed at a side of the assembling region 1110 corresponding to the first position-limiting structure 1224c, wherein the second position-limiting structure 1120 is a convex rib parallel to an assembling direction of the keyboard module 1200, and the first position-limiting structure 1224c is a bump vertical to the assembling direction of the keyboard module 1200. Moreover, the notebook computer 1000 further includes a display 1300 connected to the host 1100, and the display 1300 is used for displaying executed programs.

Figure 4:
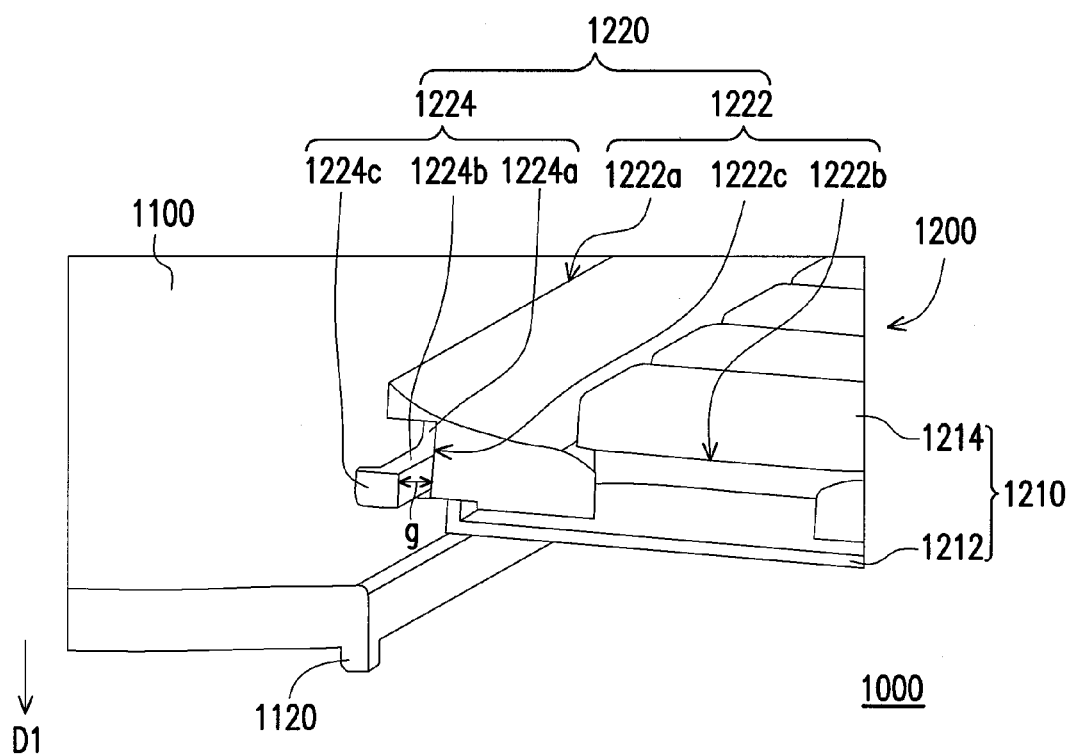
FIG. 4 is an exploded view of a keyboard module and a host of FIG. 1.

FIG. 4 is an exploded view of the keyboard module and the host of FIG. 1. Referring to FIG. 1 and FIG. 4, when the keyboard module 1200 is about to be assembled to the host 1100, the keyboard module 1200 is first disposed on the host 1100. Now, the keyboard module 1200 is still not assembled to the host 1100, and the spring arm 1224 disposed on the sidewall 1222a of the frame body 1222 of the keyboard frame 1220 is not squeezed, and present a natural state, and there is the gap g between the spring arm 1224 and the concave portion 1222c of the sidewall 1222a.

Figure 5:
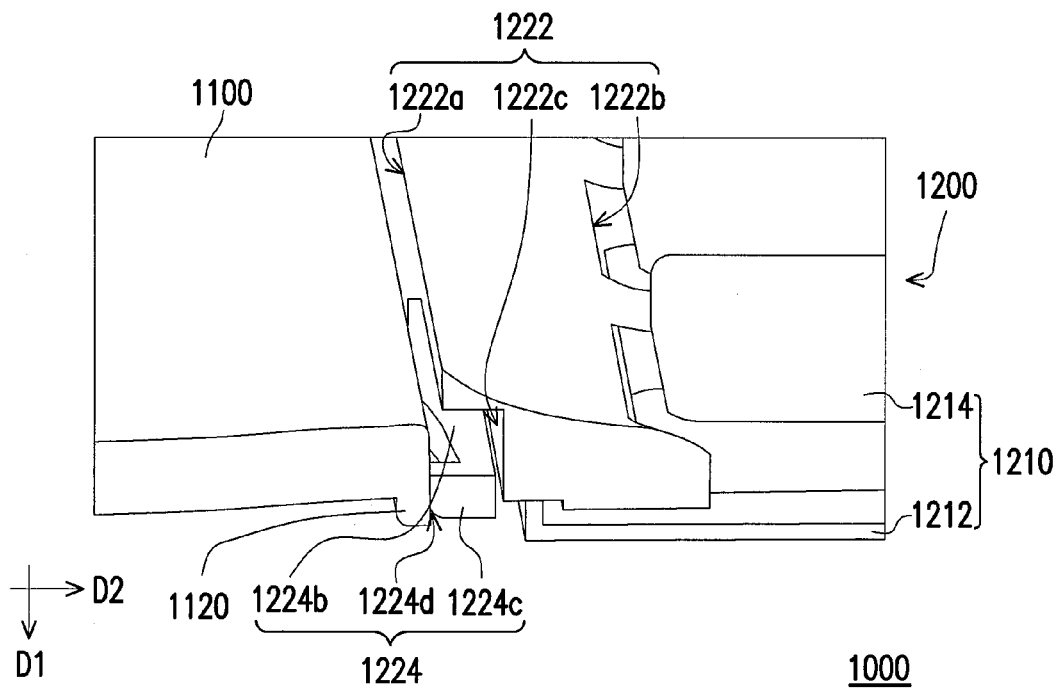
FIG. 5 is a schematic diagram illustrating a situation when a keyboard module and a host of FIG. 4 are assembled.

FIG. 5 is a schematic diagram illustrating a situation when the keyboard module and the host of FIG. 4 are assembled. Referring to FIG. 5, when the keyboard module 1200 is about to be assembled to the host 1100, the keyboard module 1200 is pushed downwards to the host 110 along a direction D1. The first position-limiting structure 1224c located at the center portion 1224b and facing to a surface of the host 1100 is interfered by a profile of the assembling region 1110 of the host 1100, so that the spring arm 1224 is deformed, and the center portion 1224b is bended towards the concave portion 1222c of the sidewall 1222a of the frame body 1222, i.e. the spring arm 1224 is bended and deformed towards a direction D2. It should be noticed that the first position-limiting structure 1224c further has a tilted guiding surface 1224d facing to the host 1100, so that when the user pushes the keyboard module 1200 downwards to the host 1100, the tilted guiding surface 1224d can be used to reduce a collision between the spring arm 1224 and the host 1100 during the assembling, so as to maintain a structural integrity, and meanwhile improve the assembling convenience.

Then, the keyboard module 1200 is continually pushed downwards to the host 1100 along the direction D1, so that the first position-limiting structure 1224c further moves along the second position-limiting structure 1120. After the first position-limiting structure 1224c moves over the second position-limiting structure 1120, the first position-limiting structure 1224c is no longer squeezed by the second position-limiting structure 1120, and the spring arm 1224 is restored to its original shape due to an elastic restoring force thereof, and now the first position-limiting structure 1224c and the second position-limiting structure 1120 are mutually interfered, as that shown in FIG. 3C.

It should be noticed that during the process of assembling the keyboard module 1200 to the host 1100, the gap g can provide an enough space to accommodate the spring arm 1224 deformed due to the squeeze. Moreover, in the present embodiment, the second position-limiting structure 1120 is assumed to be a convex rib, though it is only used as an example, and those skilled in the art can change a possible implementation pattern (for example, an opening, a through hole or a groove, etc.) of the second position-limiting structure 1120 according to an actual design requirement. Alternatively, the first position-limiting structure 1224c can also be an opening, a through hole or a groove, etc., while the second position-limiting structure 1120 is a bump, by which a mutual interference between the first position-limiting structure 1224c and the second position-limiting structure 1120 can also be achieved.

Figure 6:
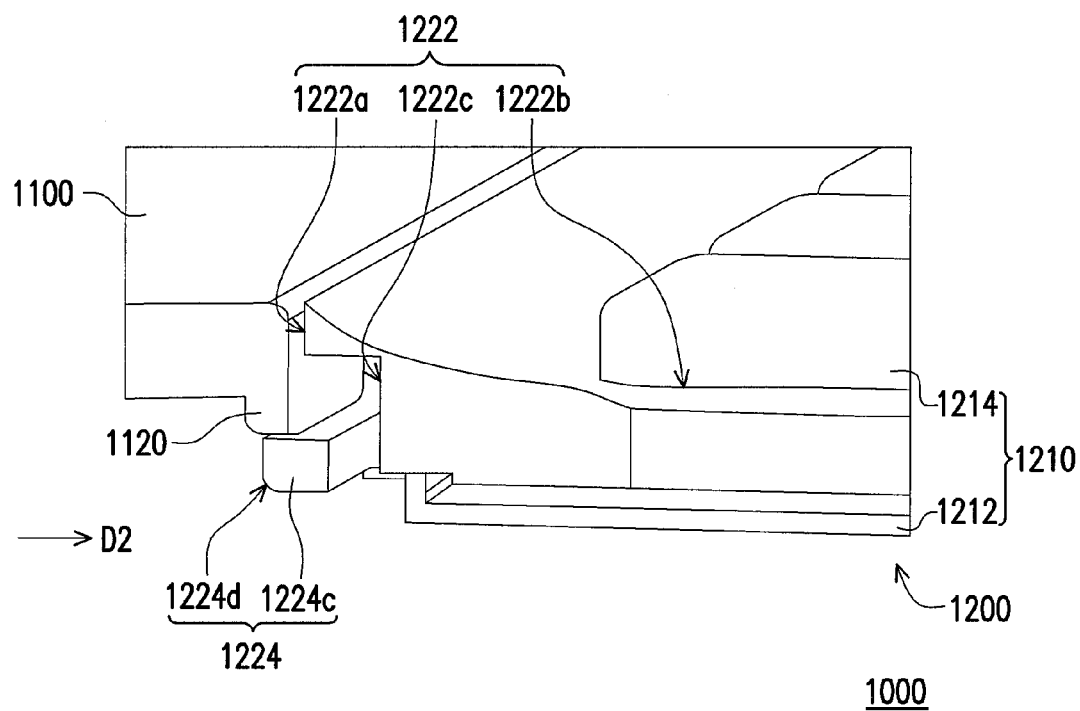
FIGS. 6-8 are schematic diagrams illustrating a process of disassembling a keyboard module from a host.
Figure 7:
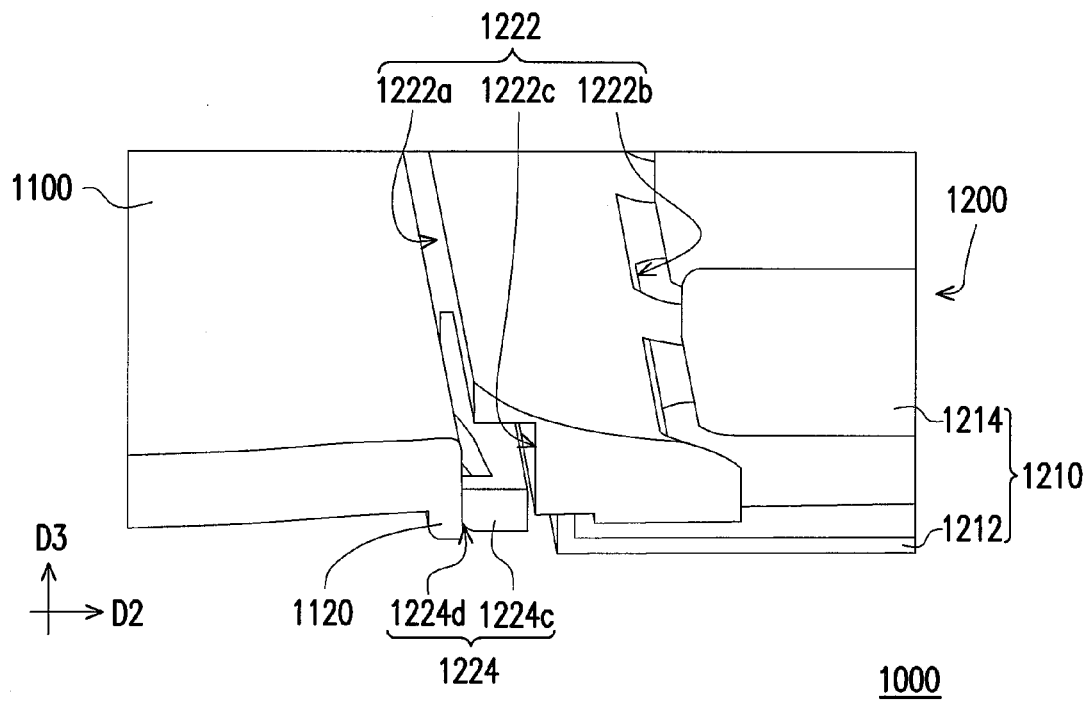
Figure 8:
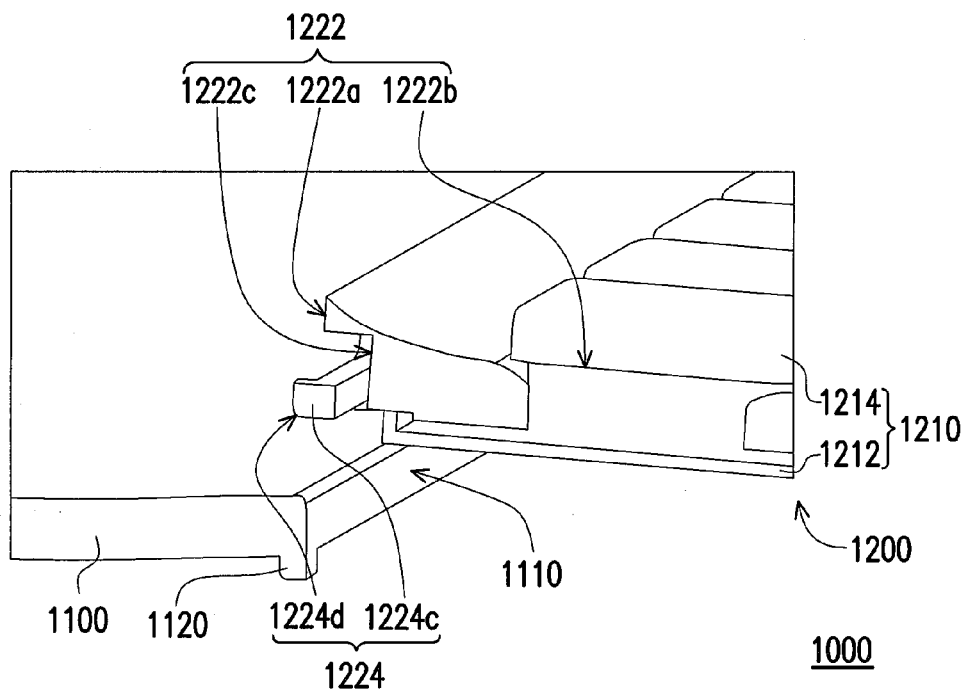

FIGS. 6-8 are schematic diagrams illustrating a process of disassembling the keyboard module from the host. Referring to FIG. 6, an external force is exerted on the first position-limiting structure 1224c of the spring arm 1224 along the direction D2, so that the spring arm 1224 is deformed, and the interference between the first position-limiting structure 1224c and the second position-limiting structure 1120 is released.

It should be noticed that before the external force is exerted on the first position-limiting structure 1224c, a bottom cover of the host 1100 has to be first disassembled, and then the steps of disassembling the keyboard module 1200 from the host 1100 are performed.

As shown in FIG. 7, the keyboard module 1200 is moved along a direction D3, and now the first position-limiting structure 1224c also moves along the second position-limiting structure 1120 towards the direction D3, and the spring arm 1224 is interfered by the profile of the assembling region 1110 of the host 1100, and is squeezed and deformed towards the direction D2.

Finally, referring to FIG. 8, the first position-limiting structure 1224c is no longer contacted to the profile of the assembling region 1110 of the host 1100, and the spring arm 1224 is restored to its original shape. Now, the keyboard module 1200 is disassembled from the host 1100.

In summary, in the notebook computer of the present invention, the spring arm is disposed on the sidewall of the frame body of the keyboard frame, and the keyboard module can be quickly assembled to the host or disassembled from the host through deformation of the spring arm, so that an assembling convenience is achieved. Moreover, the keyboard module can be assembled or disassembled without using a hand tool and locking elements, so that an assembling time and a labor cost are saved compared to the conventional technique.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A notebook computer, comprising:
    a host, having an assembling region;
    a keyboard module, disposed at the assembling region of the host, and comprising:
        a keyboard, having a substrate and a plurality of keys disposed on the substrate;
        a keyboard frame, comprising:
            a frame body, disposed on the substrate, and having a plurality of openings for exposing the keys; and
            at least one spring arm, disposed at a sidewall of the frame body, two ends of the spring arm being connected to the sidewall, and a gap being formed between a center portion of the spring arm and the sidewall, wherein the center portion has a first position-limiting structure protruding out of the assembling region, and the first position-limiting structure is mutually interfered with the host.

2. The notebook computer as claimed in claim 1, wherein the at least one spring arm and the frame body are formed integrally.

3. The notebook computer as claimed in claim 1, wherein the sidewall has a concave portion located corresponding to the center portion of the spring arm, and the gap is located between the center portion of the spring arm and the concave portion.

4. The notebook computer as claimed in claim 1, wherein the host further has a second position-limiting structure disposed at a side of the assembling region corresponding to the first position-limiting structure, and the second position-limiting structure is mutually interfered with the first position-limiting structure.

5. The notebook computer as claimed in claim 4, wherein the first position-limiting structure is a bump, and the second position-limiting structure is a convex rib.

* * * * *